US006832004B2

(12) United States Patent
So et al.

(10) Patent No.: US 6,832,004 B2
(45) Date of Patent: Dec. 14, 2004

(54) IMAGE CODING APPARATUS AND IMAGE CODING METHOD

(75) Inventors: Ikken So, Nakai-machi (JP); Masanori Sekino, Nakai-machi (JP); Shinji Shishido, Nakai-machi (JP); Yutaka Koshi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 753 days.

(21) Appl. No.: 09/794,067

(22) Filed: Feb. 28, 2001

(65) Prior Publication Data

US 2001/0024524 A1 Sep. 27, 2001

(30) Foreign Application Priority Data

Mar. 14, 2000 (JP) ........................................ 2000-070763

(51) Int. Cl.[7] ................................................. G06K 9/36
(52) U.S. Cl. ........................................ 382/238; 382/236
(58) Field of Search ................................. 382/232, 234, 382/236, 237, 238, 239; 358/426.07, 539

(56) References Cited

U.S. PATENT DOCUMENTS 5,828,789 A * 10/1998 Yokose et al. .............. 382/238

FOREIGN PATENT DOCUMENTS

JP         10-294872      11/1998

OTHER PUBLICATIONS

Marcelo J. Weinberger and Gadiel Seroussi, The LOCO–I Lossless Image Compression Algorithm: Principles and Standardization into JPEG–LS, pp. 1–33, University of Minnesota, Minneapolis, Minnesota.

* cited by examiner

Primary Examiner—Leo Boudreau
Assistant Examiner—Duy M. Dang
(74) Attorney, Agent, or Firm—Morgan Lewis & Bockius LLP

(57) ABSTRACT

An image coding apparatus includes an approximating element having plural different prediction techniques to approximate, a value of a target pixel to be coded with reference to values of peripheral pixels surrounding the target pixel; a holding element which holds information about ranks of the prediction techniques, the ranks obtained upon processing of the pixel preceding the target pixel; a determining element computing an error between each of approximate values obtained by the prediction techniques and that of the target pixel, selecting one of the prediction techniques for the target pixel based on the computer error, and performing the selection by preferentially referencing the rank information if the error is within a predetermined tolerance; and a coding element which codes the value of the target pixel using the approximate value obtained by the selected prediction technique.

6 Claims, 13 Drawing Sheets

FIG.4

| R0 | R1 | R2 | R3 | R4 |
|----|----|----|----|----|
| R5 | R6 | R7 | R8 | R9 |
| R10 | R11 | X | | |

TARGET PIXEL TO BE CODED : X

VALUES OF DECODED PERIPHERAL PIXELS : $R_i \{i=0.11\}$

FIG.5

| | |
|---|---|
| DECODED PIXEL VALUE OF INTERPOLATOR : H | $H = \dfrac{(R_7 + R_{11})}{2}$ |
| DECODED PIXEL VALUE OF INTERPOLATOR : L (MEAN VALUE OF PERIPHERAL PIXELS $R_i$) | $L = AVE(R_i) = \dfrac{1}{12}\sum_{i=0}^{11} R_i$ |
| DECODED PIXEL VALUE OF QUANTIZER : T (MEAN VALUE OF PERIPHERAL PIXELS BEING $R_i \geq L$) | $T = AVE(R_i \geq L)$ |
| DECODED PIXEL VALUE OF QUANTIZER : B (MEAN VALUE OF PERIPHERAL PIXELS BEING $R_i \geq L$) | $B = AVE(R_i \geq L)$ |
| DECODED PIXEL VALUE OF QUANTIZER : E | $E = X$ |

IMAGE CODING APPARATUS AND IMAGE CODING METHOD

BACKGROUND OF THE INVENTION

1. Field of the Invention

The present invention relates to an image coding apparatus and an image coding method for compressively coding image data.

2. Description of the Related Art

Image data generally falls into two broad categories: artificial image data generated by computer such as image data described in PDL (page description language), and scan-in image data read by scanner such as bit map image data. These two kinds of image data are most often coded compressively in order to reduce their quantities.

Illustratively, JPEG-LS (Part-1 ISO/IEC FDIS 14495-1) is known as a coding technique applicable to both artificial image data and scan-in image data. JPEG-LS has been standardized as a method for improving by about 10 percent the coding efficiency achieved by JPEG (Joint Photographic Expert Group) and JBIG (Joint Bi-level Image Experts Group) schemes. A major characteristic of the JPEG-LS method is that it applies lossless (reversible) coding to artificial image data and near-lossless (near-reversible) coding to scan-in image data.

FIG. 13 is a schematic block diagram of a typical image coding apparatus adopting JPEG-LS for image data coding. This image coding apparatus works as follows: input image data 401 and decoded pixel data 402 are first fed to a window composing element 41. In turn, the window composing element 41 sends a group of peripheral pixel values 403 to a pixel value gradient determining element 42. Given the peripheral pixel values, the pixel value gradient determining element 42 computes a pixel value gradient of the peripheral pixels surrounding a target pixel to be coded. If the computed gradient is found less than a tolerance 404 coming from a tolerance designating element 43, the target pixel to be coded is judged flat and control is passed on to a run length extracting element 44. If the gradient is found greater than the tolerance 404, then regular mode is entered. That is, a pixel value predicting element 45 predicts a value of the target pixel to be coded on the basis of the peripheral pixel value group 403. A prediction error computing element 46 computes a prediction error regarding the target pixel. A prediction error quantizing element 47 quantizes the computed prediction error. Taking the quantized prediction error as a coding symbol 406, an information source coding element 48 codes the prediction error. The coded output of the element 48 combines with a code from the run length extracting element 44 to become output coded data 407. A local decoding element 49 performs local decoding and supplies the result as decoded pixel data 402 to the window composing element 41.

The JPEG-LS method outlined above is based on pixel value prediction and has no recourse to resolution adaptation known as sub-sampling. Sub-sampling involves discarding the whole information furnished by any one pixel. In low frequency image regions, particularly in graduated portions of scan-in image data, sub-sampling should preferably be utilized to enhance the efficiency of coding. In the setup of FIG. 13, however, the pixel value gradient determining element 42 determines whether or not to proceed with sub-sampling based on the gradient of pixels around the target pixel to be coded. In other words, the sub-sampling of the setup has no direct relation to prediction error.

Meanwhile, some of the image data coding techniques proposed so far have introduced the concept of sub-sampling into predicted coding. Illustratively, Japanese Published Unexamined Patent Application No. Hei 10-294872 discloses a sub-sampling-based coding technique for selecting an index (identification information) of one of multiple predictors that has the smallest prediction error so that a run length of the rank of the selected index is coded.

More particularly, as shown in FIG. 14, a group of peripheral pixel values 503 representing pixels around a target pixel to be coded is acquired through a window composing element 51. Given the peripheral pixel value group 503, a pixel value approximating element 52 having multiple predictors computes a group of decoded pixel value candidates 504. An error selecting element 54 checks for a difference between each of the pixel values approximated by the pixel value approximating element 52 on the one hand, and the value of a target pixel in an image of interest on the other hand. If the difference (i.e., prediction error) is found less than a tolerance 505 coming from a tolerance designating element 53, then the error selecting element 54 sends an index of the predictor having the smallest prediction error to a decoded pixel selecting element 55 and a rank/run length extracting element 56. If the prediction error is judged to be greater than the tolerance 505, the error selecting element 54 supplies the rank/run length extracting element 56 with an index of an error minimizing approximation 506 for minimizing the prediction error as well as with the value of the prediction error in effect at that point. Based on the error minimizing approximation index 506 or the prediction error value received from the error selecting element 54, the rank/run length extracting element 56 extracts a run length of the index rank and sends it as a coding symbol 507 to an information source coding element 57. The information source coding element 57 performs information source coding to compress the statistical redundancy included in the coding system 507 to provide output coded data 508. The decoded pixel selecting element 55, given the error minimizing approximation index 506, selects a decoded pixel value from the group of decoded pixel value candidates 504 and feeds it as decoded pixel data 502 to the window composing element 51 for decoding of the next pixel.

In the manner described above, the coding technique of Japanese Published Unexamined Patent Application No. Hei 10-294872 adopting the concept of sub-sampling subjects artificial image data and scan-in image data to the same framework of reversible and near-reversible coding, and executes an image coding process by coding indexes of prediction techniques (predictors) for approximating each target pixel to be coded. That is, the approximation techniques (predictors) based on important factors of images are adopted for data compression without deterioration of image quality.

However, the conventional image data coding method disclosed by the above-cited patent application has its share of deficiencies. The method, in selecting one of the prediction techniques (predictors) for approximating the target pixel to be coded, abides by a single rule dictating that the selected technique be one that has the smallest prediction error. Hence the possible major flaw of the method as outlined below.

With pixel values making up artificial image data, efforts to reduce their prediction errors translate into improvements in image quality of non-reversible coding. Pixel values constituting scan-in image data, on the other hand, undergo MTF (modulation transfer function) illustratively in the optics of a scanner and otherwise gather various noises along the way. For that reason, minimizing the prediction error of each pixel does not necessarily result in improvements in image quality of non-reversible coding.

The above-cited conventional image data coding technique, particularly when addressing scan-in image data and when their prediction errors exceed a tolerance, is liable not only to worsen its coding efficiency but also to slow down its processing speed. That is because the prediction errors themselves are coded. Even if the prediction errors are below the tolerance, the selected predictor tends to change frequently as long as the sole judging rule dictates that the prediction error be minimal per pixel. The tendency defeats the supposed effects of coding run lengths of index ranks, rendering the coding process inefficient. Furthermore, improvements in image quality cannot be expected unless predictors are selected not on the basis of pixel-by-pixel local information but based on more extensive information.

SUMMARY OF THE INVENTION

The present invention has been made in view of the above circumstances and provides an image coding apparatus and an image coding method which, when subjecting artificial and scan-in image data to the same framework of reversible or near-reversible coding, select a technique for predicting a target pixel to be coded not on the basis of pixel-by-pixel local information alone but based on more extensive information, thereby boosting coding efficiency and enhancing image quality in non-reversible coding without recourse to bulky computation resources or massive calculation processes.

In carrying out the invention and according to one aspect thereof, there is provided an image coding apparatus including an approximating element which has plural different prediction techniques to approximate, in input image data, a value of a target pixel to be coded with reference to values of peripheral pixels surrounding the target pixel, and a holding element which holds information about ranks of the prediction techniques. The ranks are obtained upon processing of the pixel preceding the target pixel. The apparatus also includes a determining element which computes an error between each of approximate values obtained by the plural prediction techniques and the value of the target pixel, and which selects for the target pixel one of the prediction techniques based on the computed error. The determining element performs the selection by preferentially referencing the rank information held in the holding element if the error is within a predetermined tolerance. The apparatus further includes a coding element which codes the value of the target pixel using the approximate value obtained by the prediction technique selected by the determining element.

According to another aspect of the invention, there is provided an image coding apparatus including an approximating element which has plural different prediction techniques to approximate, in input image data, a value of a target pixel to be coded with reference to values of peripheral pixels surrounding the target pixel, and a holding element which holds information about run lengths approximated by the prediction techniques. The run lengths are obtained upon processing of each pixel preceding the target pixel. The apparatus also includes a determining element which computes an error between each of approximate values obtained by the plural prediction techniques and the value of the target pixel, and which selects for the target pixel one of the prediction techniques based on the computed error. The determining element performs the selection by preferentially referencing the run lengths specified by the information held in the holding element if the error is within a predetermined tolerance. The apparatus further includes a coding element which codes the value of the target pixel using the approximate value obtained by the prediction technique selected by the determining element.

According to a further aspect of the invention, there is provided an image coding method including the steps of approximating, in input image data, a value of a target pixel to be coded with reference to values of peripheral pixels surrounding the target pixel by using plural different prediction techniques, and computing an error between each of approximate values obtained by the prediction techniques and the value of the target pixel, to determine whether the computed error is within a predetermined tolerance. The method further includes the steps of, if the error is found to be within the predetermined tolerance and if the prediction techniques have been given ranks beforehand, selecting one of the prediction techniques for the target pixel by preferentially referencing the ranks, if the error is not within the predetermined tolerance and if the prediction techniques are not given ranks, then selecting one of the prediction techniques for addressing the target pixel on the basis of differences in magnitude between the errors regarding the approximate values, and coding the target pixel using the approximate value provided by the selected prediction technique.

According to an even further aspect of the invention, there is provided an image coding method including the steps of approximating, in input image data, a value of a target pixel to be coded with reference to values of peripheral pixels surrounding the target pixel by using plural different prediction techniques, and computing an error between each of approximate values obtained by the plural prediction techniques and the value of the target pixel, to determine whether the computed error is within a predetermined tolerance. The method further includes the steps of, if the error of any one of the approximate values obtained by any one of the prediction techniques is found to be within the predetermined tolerance and if the target pixel is shifted successively from one pixel position to another within the input image data, determining whether the errors of the approximate values obtained by the same prediction technique in different pixel positions fall successively within the predetermined tolerance, if the errors of pixels having run lengths are found to be successively within the predetermined tolerance, then selecting one of the prediction techniques that provides the largest run length as the prediction technique for a group of pixels corresponding to the largest run length, if the computed error is not found to be within the predetermined tolerance and if the errors in different pixel positions are not successively found to be within the tolerance, then selecting one of the prediction techniques for the target pixel on the basis of differences in magnitude between the errors regarding the approximate values, and coding the target pixel using the approximate value provided by the selected prediction technique.

From one point of view, the inventive image coding apparatus and image coding method determine, upon selecting one of multiple prediction techniques to approximate the value of target pixel to be coded, whether the error of each approximated value falls within a predetermined tolerance. If the error of the value approximated by each prediction technique is found to be within the tolerance and if the prediction techniques have been given ranks beforehand, these ranks are preferentially referenced in selecting one of the prediction techniques for addressing the target pixel. That is, not only the prediction error per pixel but also the rank of each prediction technique with respect to the preceding pixel is taken into account in selecting the appropriate prediction technique. It follows that as long as the errors fall within the tolerance, the ranks of the prediction techniques will not change frequently.

From another point of view, the inventive image coding apparatus and image coding method determine, upon selecting one of multiple prediction techniques to approximate the value of target pixel to be coded, whether the errors of the approximate values obtained by the same prediction technique in different pixel positions fall successively within the predetermined tolerance. If the errors are found to be successively within the predetermined tolerance, one of the prediction techniques is selected preferentially in terms of run lengths. That is, since not only the prediction errors per pixel but also their run lengths are used as a selection rule, what is preferentially selected from among the prediction techniques with their errors falling within the tolerance is the technique having the largest run length.

Other features and advantages of the invention will become more apparent upon a reading of the following description and appended drawings.

BRIEF DESCRIPTION OF THE DRAWINGS

Preferred embodiments of the present invention will be described in detail with reference to the following figures wherein:

FIG. 4 is a schematic explanatory view that helps explain prediction techniques used by the image coding method according to the invention;

FIG. 5 is an explanatory view outlining prediction techniques used by the inventive image coding method;

DESCRIPTION OF THE PREFERRED EMBODIMENTS

First Embodiment

An image coding apparatus and an image coding method practiced as the first embodiment are described below. The image coding apparatus is first described by referring to FIG. 1, i.e., a schematic block diagram of the apparatus.

Figure 1:
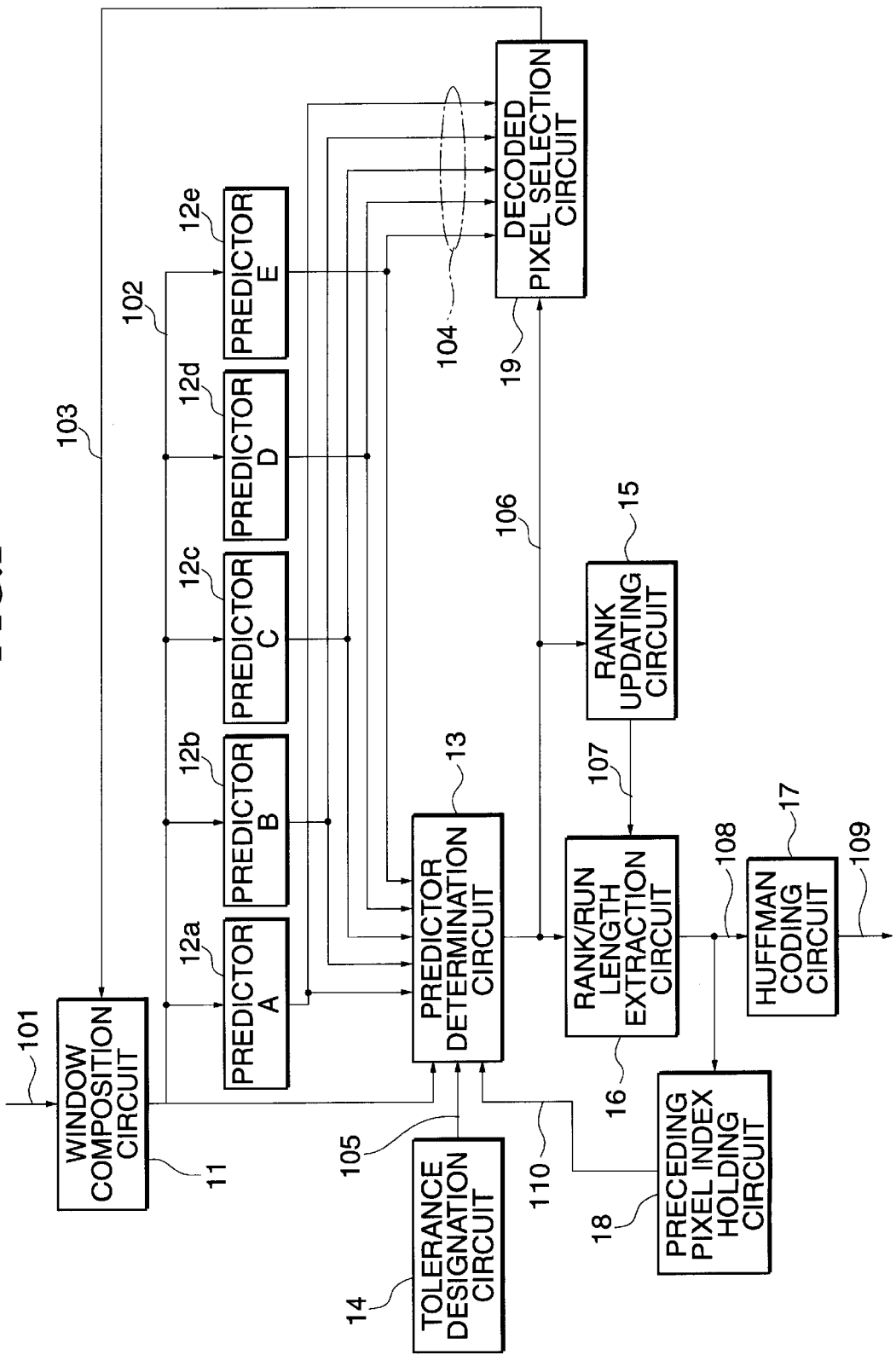
FIG. 1 is a schematic block diagram of an image coding apparatus practiced as part of a first embodiment of this invention.

As shown in FIG. 1, the image coding apparatus of the first embodiment is constituted by a window composition circuit 11, multiple predictors 12a through 12e, a predictor determination circuit 13, a tolerance designation circuit 14, a rank updating circuit 15, a rank/run length extraction circuit 16, a Huffman coding circuit 17, a preceding pixel index holding circuit 18, and a decoded pixel selection circuit 19. Each of the component circuits is described below in detail.

The window composition circuit 11 receives input image data 101 that are entered illustratively pixel by pixel in raster scan sequence. From the input image data 101, the window composition circuit 11 extracts a value of a target pixel to be coded (i.e., pixel of interest), as well as decoded values of a group of peripheral pixels surrounding the target pixel. The decoded values thus extracted are sent as a peripheral pixel value group 102 to the predictors 12a through 12e and to the predictor determination circuit 13. The values of the peripheral pixels around the target pixel are extracted on the basis of decoded pixel data 103 coming from the decoded pixel selection circuit 19 as will be described later.

Given the peripheral pixel value group 102 from the window composition circuit 11, each of the predictors 12a through 12e approximates through prediction a value of the target pixel using a different prediction technique. The approximated values are sent as a decoded pixel value candidate group 104 to the predictor determination circuit 13 and decoded pixel selection circuit 19. In other words, the predictors 12a through 12e function as the approximating element of this invention. It is assumed that prediction techniques of the predictors 12a through 12e each include multiple quantization and sub-sampling (interpolation) techniques utilizing a group of decoded pixel values. Illustratively, one quantization technique may involve using for quantization the largest of a group of decoded pixel values on the basis of: an average of the pixels immediately left and immediately on top of a pixel of interest; an average of a group of all peripheral pixels surrounding the pixel of interest; a mean value greater than the average of the group of all peripheral pixels surrounding the pixel of interest; a mean value less than the average of the group of all peripheral pixels surrounding the pixel of interest; or prediction errors themselves. Another quantization technique may involve resorting to medians, and another quantization technique may be an interpolation technique utilizing an average of a group of decoded pixel values as an interpolated value. All these techniques are designed to approximate the value of the target pixel to be coded.

The predictor determination circuit 13 computes errors in terms of differences between the value of the pixel of interest included in a peripheral pixel value group 102 from the window composition circuit 11 on the one hand, and a decoded pixel value candidate group 104 from the predictors 12a through 12e, i.e., approximate values of the pixel of interest predicted by the predictors 12a through 12e on the other hand. The prediction errors thus obtained are compared with a tolerance 105 designated by the tolerance designation circuit 14. As a result of the comparison, the predictor determination circuit 13 selects one of the predictors for addressing the pixel of interest. The result of the selection is sent to the rank updating circuit 15, rank/run length extraction circuit 16, and decoded pixel selection circuit 19 as a global pixel information priority technique index 106. If the errors of prediction by all predictors 12a through 12e are found to exceed the tolerance 105, the predictor determination circuit 13 selects preferentially the predictor with the smallest prediction error. If some of the prediction errors are found to be within the tolerance 105, then the predictor determination circuit 13 selects from among the predictors associated with the tolerance-compliant errors a predictor which meets a specific condition. That condition dictates that if the preceding pixel index holding circuit 18, to be described later, has in its contents the same ranking index as that adopted for the preceding pixel, the predictor applicable to that index should be selected unconditionally; otherwise the predictor whose prediction error is the smallest of those within the tolerance 105 should be selected. That is, the predictor determination circuit 13 functions as the determining element of this invention.

The tolerance designation circuit 14 retains a predetermined tolerance 105. At the same time, the circuit 14 designates the tolerance 105 to the predictor determination circuit 13.

Based on the global pixel information priority technique index 106 from the predictor determination circuit 13, the rank updating circuit 15 determines information 107 on correspondence between approximations and ranks regarding the predictors 12a through 12e. The information 107 is forwarded to the rank/run length extraction circuit 16. The rank updating circuit 15 updates ranks according to the global pixel information priority technique index 106 after any one target pixel has been coded. The updating of ranks may be done in order of certainty. For example, the most recently selected approximation technique may be ranked first; the most frequently selected approximation technique in the coding of several past pixels may be ranked first; or the first rank may be accorded to the approximation technique judged to have the largest run length as a result of the coding of several past pixels.

Given the approximation-and-rank correspondence information 107 from the rank updating circuit 15, the rank/run length extraction circuit 16 determines a rank relevant to the global pixel information priority technique index 106 in counting up a rank run length. The rank run length is sent as a coding symbol 108 to the Huffman coding circuit 17 and preceding pixel index holding circuit 18. If first ranks are found to continue, the rank/run length extraction circuit 16 outputs their continuous length, i.e., run length. If a prediction error received as a global pixel information priority technique index 106 is found to exceed the tolerance, the rank/run length extraction circuit 16 passes on the error, unmodified, as the coding symbol 108 for output.

The Huffman coding circuit 17 receives the coding symbol 108 from the rank/run length extraction circuit 16, codes it into an information source, and sends the coded result as output coded data 109 to the outside of the image coding apparatus. More specifically, the Huffman coding circuit 17 refers to the Huffman coding table when coding the coding symbol 108. The Huffman coding scheme for information source coding may be replaced by some other suitable scheme for suppressing statistical redundancy in coding symbols, such as arithmetic coding. The Huffman coding circuit 17 functions as the coding element of this invention.

The preceding pixel index holding circuit 18 receives and temporarily stores the coding symbol 108 from the rank/run length extraction circuit 16. The received symbol is then sent to the predictor determination circuit 13 as a ranking index (called the preceding pixel index) 110 adopted for the pixel preceding the current pixel of interest. That is, the preceding pixel index holding circuit 18 functions as the holding element of this invention.

The decoded pixel selection circuit 19 selects from among the group of decoded pixel value candidates 104 a candidate which corresponds to the global pixel information priority technique index 106. The selected candidate is output as decoded pixel data 103 for use by the window composition circuit 11 in extracting peripheral pixel values.

Figure 2:
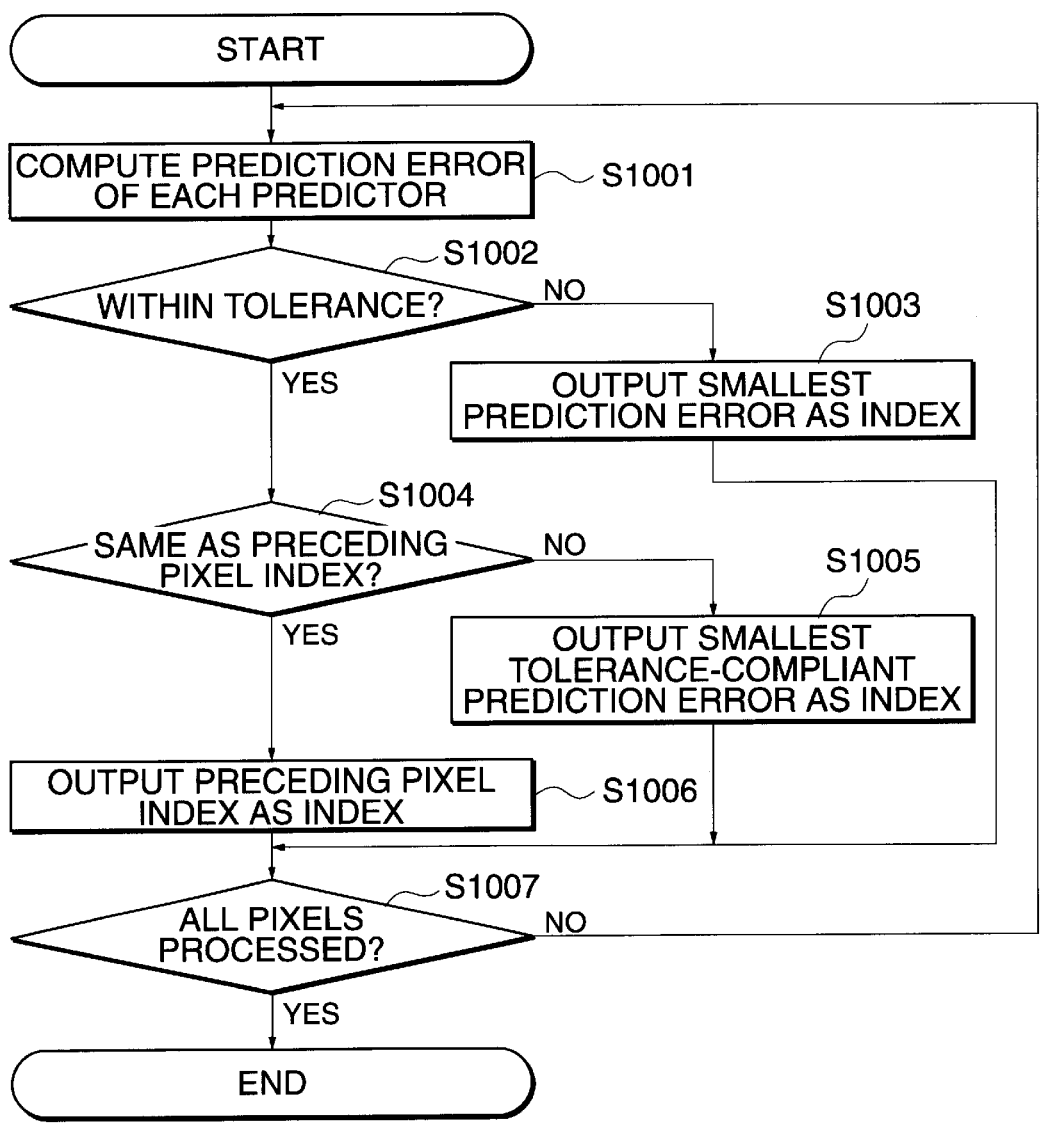
FIG. 2 is a flowchart of steps constituting an image coding method implemented as part of the first embodiment, the flowchart showing more particularly steps performed by a predictor determination circuit in the image coding apparatus of FIG. 1.
Figure 3:
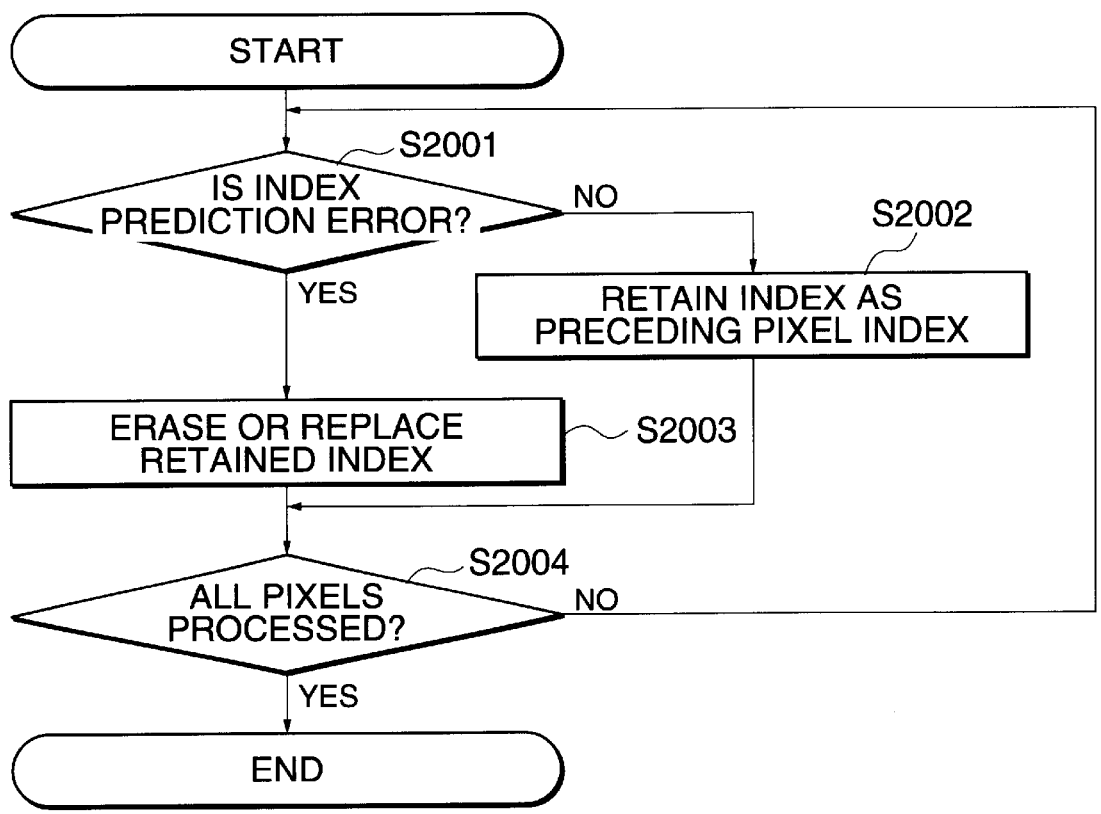
FIG. 3 is a flowchart of steps constituting the image coding method implemented as part of the first embodiment, the flowchart showing more particularly steps performed by a preceding pixel index holding circuit in the image coding apparatus of FIG. 1.

How the image coding apparatus of the above-described constitution illustratively works will now be described. FIGS. 2 and 3 are flowcharts of steps constituting the image coding method as part of the first embodiment of this invention. FIGS. 4 and 5 are explanatory views outlining typical prediction techniques used by the image coding method.

As shown in FIG. 4, the window composition circuit 11 of the image coding apparatus initially receives input image data 101 on a pixel-by-pixel basis in raster scan sequence, and regards each pixel as a target pixel X to be coded. The target pixel X and previously decoded peripheral pixels R0 through R11 around the target pixel are sent collectively to the predictors 12a through 12e as a peripheral pixel value group 102. The predictors 12a through 12e each approximate the target pixel X using different prediction techniques (H, L, T, B, E . . . ), as shown in FIG. 5.

After the predictors 12a through 12e have approximated values of the target pixel X, the predictor determination circuit 13 of the image coding apparatus compares the approximate values of the target pixel from the predictors with the target pixel value included in the peripheral pixel value group 102 from the window composition circuit 11, as indicated in FIG. 2. The comparison yields prediction errors of the predictors 12a through 12e (in step 1001; hereinafter, step is referred to as "S"). The predictor determination circuit 13 checks to see if each of the computed prediction errors falls within the tolerance 105 designated by the tolerance designation circuit 14 (S1002).

If none of the prediction errors is found to be within the tolerance 105, the predictor determination circuit 13 selects from among the predictors 12a through 12e the predictor that has the smallest of errors in magnitude. The prediction error associated with the selected predictor is output as a global pixel information priority technique index 106 (S1003).

If any one of the prediction errors is judged to be within the tolerance 105, the predictor determination circuit 13 checks to see whether the predictor associated with the tolerance-compliant error has the same preceding pixel index 110 as that held by the preceding pixel index holding circuit 18, i.e., whether the predictor in question is the same as the predictor which was identified by the preceding pixel index 110 and which was selected in processing of the pixel preceding the target pixel (S1004).

If the predictor in question has the same index as the preceding pixel index 110, the predictor determination circuit 13 unconditionally adopts the preceding pixel index 110 and outputs it as the global pixel information priority technique index 106 (S1006). If the predictor in question is found to have an index different from the preceding pixel index 110, the predictor determination circuit 13 selects the predictor that has yielded the smallest of the prediction errors complying with the tolerance 105. The prediction error associated with the selected predictor is then output as the global pixel information priority technique index 106 (S1005).

That is, when determining the global pixel information priority technique index 106, the predictor determination circuit 13 selects the predictor that has the smallest of prediction errors as long as the prediction errors of all predictors 12a through 12e exceed the tolerance 105. If some of the prediction errors fall within the tolerance 105, the predictor determination circuit 13 selects either the predictor identified by the preferentially referenced contents of the preceding pixel index 110 or the predictor that has the smallest prediction error. In this manner, a predictor meeting a specific condition is selected from among the predictors whose prediction errors have been computed.

The predictor determination circuit 13 checks to see whether all pixels making up the input image data 101 have been processed (S1007). The steps above are repeated until all pixels have been dealt with (S1001 through S1007).

Given the global pixel information priority technique index 106 from the predictor determination circuit 13, the rank/run length extraction circuit 16 outputs either the coding symbol 108 or the run length accordingly. The Huffman coding circuit 17 codes the coding symbol 108 by referring illustratively to the Huffman coding table. The coded result is output as the output coded data 109.

At this point, the preceding pixel index holding circuit 18 holds the preceding pixel index 110 by following the steps shown in FIG. 3. The preceding pixel index holding circuit 18 first checks to see whether the coding symbol 108 from the rank/run length extraction circuit 16, i.e., the global pixel information priority technique index 106 from the predictor determination circuit 13, is a prediction error (S2001). In other words, the preceding pixel index holding circuit 18 checks to see if the global pixel information priority technique index 106 has been determined on the basis of differences in magnitude between the prediction errors of the predictors 12a through 12e.

If the global pixel information priority technique index 106 is not found to be a prediction error, the preceding pixel index holding circuit 18 judges that there was a prediction error complying with the tolerance 105 upon determination of the index 106 by the predictor determination circuit 13 and that the index 106 was the same as the preceding pixel index 110. The global pixel information priority technique index 106 is then preserved as the preceding pixel index 110 (S2002). The preceding pixel index 110 thus retained is made available for use by the predictor determination circuit 13 in processing the next target pixel to be coded.

If the global pixel information priority technique index 106 is found to be a prediction error, then the preceding pixel index holding circuit 18 judges that the continuity of equally ranked indexes has been broken and proceeds to erase the retained preceding pixel index 110 (S2003). At this point, the preceding pixel index holding circuit 18 substitutes the prediction error in question for the erased preceding pixel index 110 and retains the error. The prediction error thus held is made available for use by the predictor determination circuit 13 in processing the next target pixel to be coded.

The preceding pixel index holding circuit 18 checks to see if all pixels making up the input image data 101 have been processed (S2004). The steps above are repeated until all pixels have been dealt with (S2001 through S2004).

According to the image coding apparatus and image coding method of the first embodiment, as described above, one of the multiple predictors 12a through 12e is selected to approximate the value of the target pixel to be coded. In that case, if the errors of prediction by the predictors 12a through 12e fall within the tolerance 105 and if the preceding pixel index 110 is being held, then the retained index 110 is applied preferentially to the current target pixel as well. Thus as long as the prediction errors comply with the tolerance 105, the ranking indexes of the predictors 12a through 12e do not change frequently.

That is, the image coding apparatus or image coding method of the first embodiment adopts as a selection rule not only the prediction errors in increments of pixels but also the ranking indexes of the predictors 12a through 12e in effect in processing of the preceding pixel. This prevents the ranking indexes of the predictors 12a through 12e from getting altered frequently and thereby enhances coding efficiency while forestalling deterioration in image quality due to tolerance restrictions. Concurrently the burdens of coding computations are alleviated. Where not only artificial image data but also noise-plagued scan-in image data are to be dealt with, the ranking indexes of the predictors are turned into run lengths through prediction coding by preferentially regarding the ranking index of the predictor that determined the preceding pixel value as representative of a more extensive area of pixels, whereby coding efficiency is improved.

Second Embodiment

Figure 6:
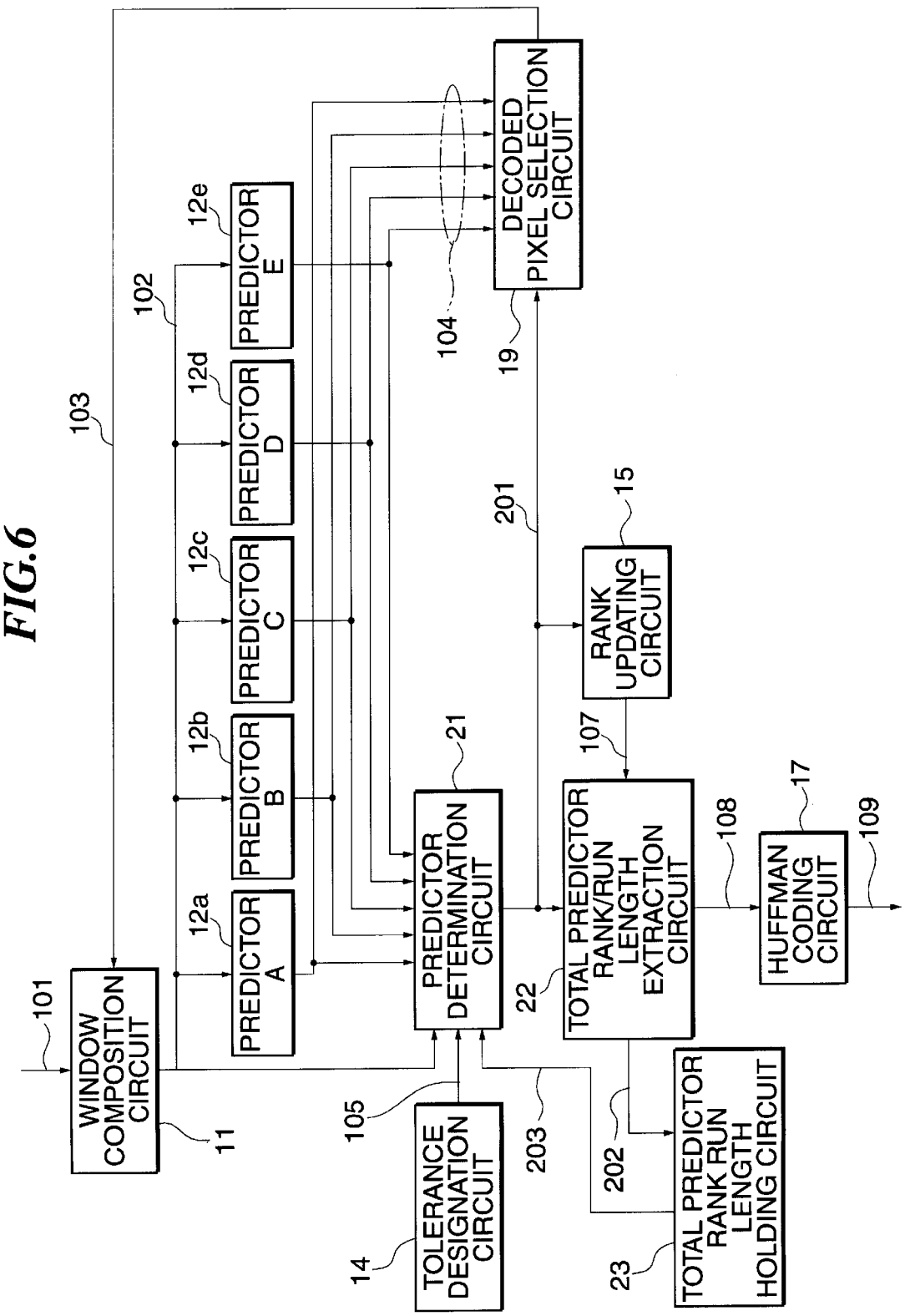
FIG. 6 is a schematic block diagram of an image coding apparatus practiced as part of a second embodiment of this invention.

An image coding apparatus and an image coding method practiced as the second embodiment are described below. A constitution of the image coding apparatus is described first. FIG. 6 is a schematic block diagram of the image coding apparatus practiced as the second embodiment of this invention. In FIG. 6, the component parts having the same or corresponding functions as their counterparts of the first embodiment are designated by like reference numerals, and their descriptions are omitted as redundant. The description below highlights differences between the two embodiments.

As illustrated, what makes the image coding apparatus of the second embodiment specifically different from the first embodiment is the presence of a predictor determination circuit 21, a total predictor rank/run length extraction circuit 22, and a total predictor rank run length holding circuit 23. Each of these circuits is described below in detail.

The predictor determination circuit 21 receives: a peripheral pixel value group 102 from the window composition circuit 11, approximate values of a target pixel predicted by the predictors 12a through 12e, and a tolerance 105 from the tolerance designation circuit 14. In turn, the predictor determination circuit 21 selects one of the predictors for processing the target pixel, and sends the result of the selection to the rank updating circuit 15, decoded pixel selection circuit 19 and total predictor rank/run length extraction circuit 22 as a global pixel information priority technique index 201. It should be noted that the predictor determination circuit 21 regards maximum run length information 203 from the total predictor rank run length holding circuit 23 (to be described later) as a determining rule for predictor selection in disregard of the preceding pixel index 110 used by the first embodiment. That is, the predictor determination circuit 21 functions as the determining element of this invention.

The total predictor rank/run length extraction circuit 22 receives the global pixel information priority technique index 201 from the predictor determination circuit 21 and approximation-and-rank correspondence information 107 from the rank updating circuit 15. In response, the circuit 22 yields a coding symbol 108 and sends it to the Huffman coding circuit 17. Given the approximation-and-rank correspondence information 107, the total predictor rank/run length extraction circuit 22 counts a continuous length (i.e., run length) regarding all predictors 12a through 12e and sends the result to the total predictor rank run length holding circuit 23 as total predictor run length information 202.

The total predictor rank run length holding circuit 23 receives the total predictor run length information 202 from the total predictor rank/run length extraction circuit 22 for temporary retention. Based on the information thus retained, the circuit 23 yields run length information about all predictors 12a through 12e and sends it as maximum run length information 203 to the predictor determination circuit 21. That is, the total predictor rank run length holding circuit 23 functions as the holding element of this invention holding the total predictor rank run length.

Figure 7:
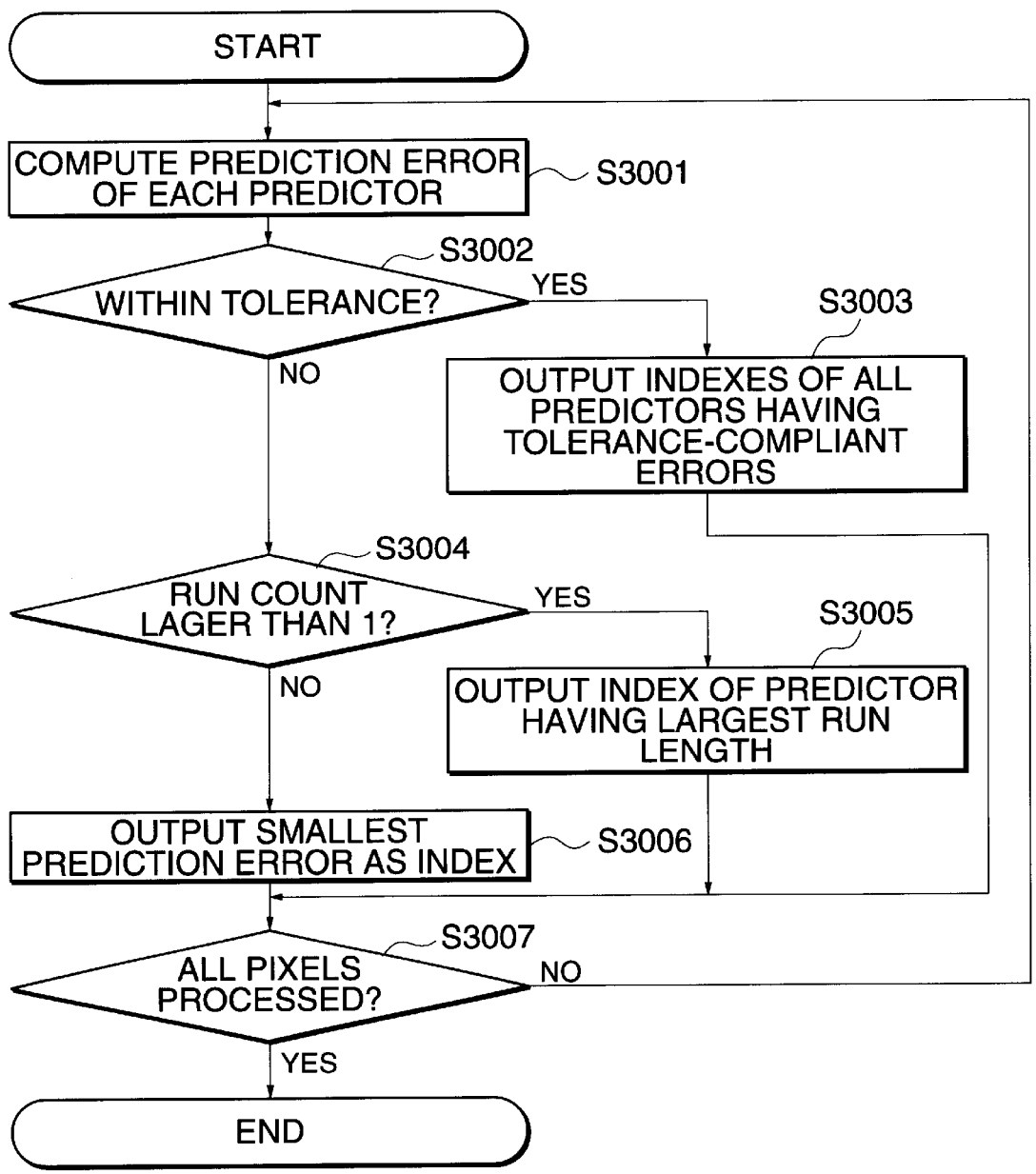
FIG. 7 is a flowchart of steps constituting an image coding method implemented as part of the second embodiment, the flowchart showing more particularly steps performed by a predictor determination circuit in the image coding apparatus of FIG. 6.
Figure 8:
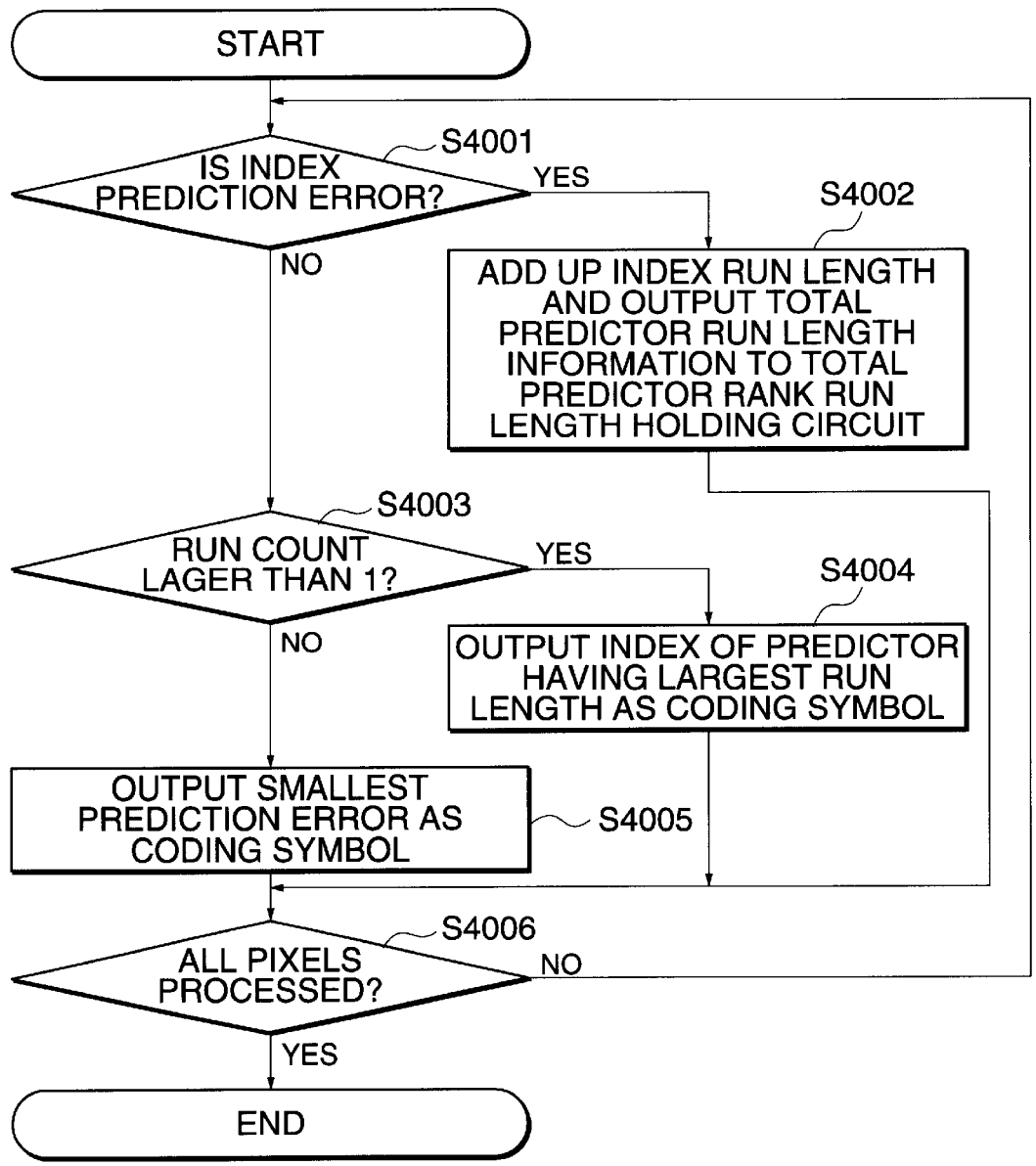
FIG. 8 is a flowchart of steps constituting the image coding method implemented as part of the second embodiment, the flowchart showing more particularly steps performed by a total predictor rank/run length extraction circuit in the image coding apparatus of FIG. 6.
Figure 9:
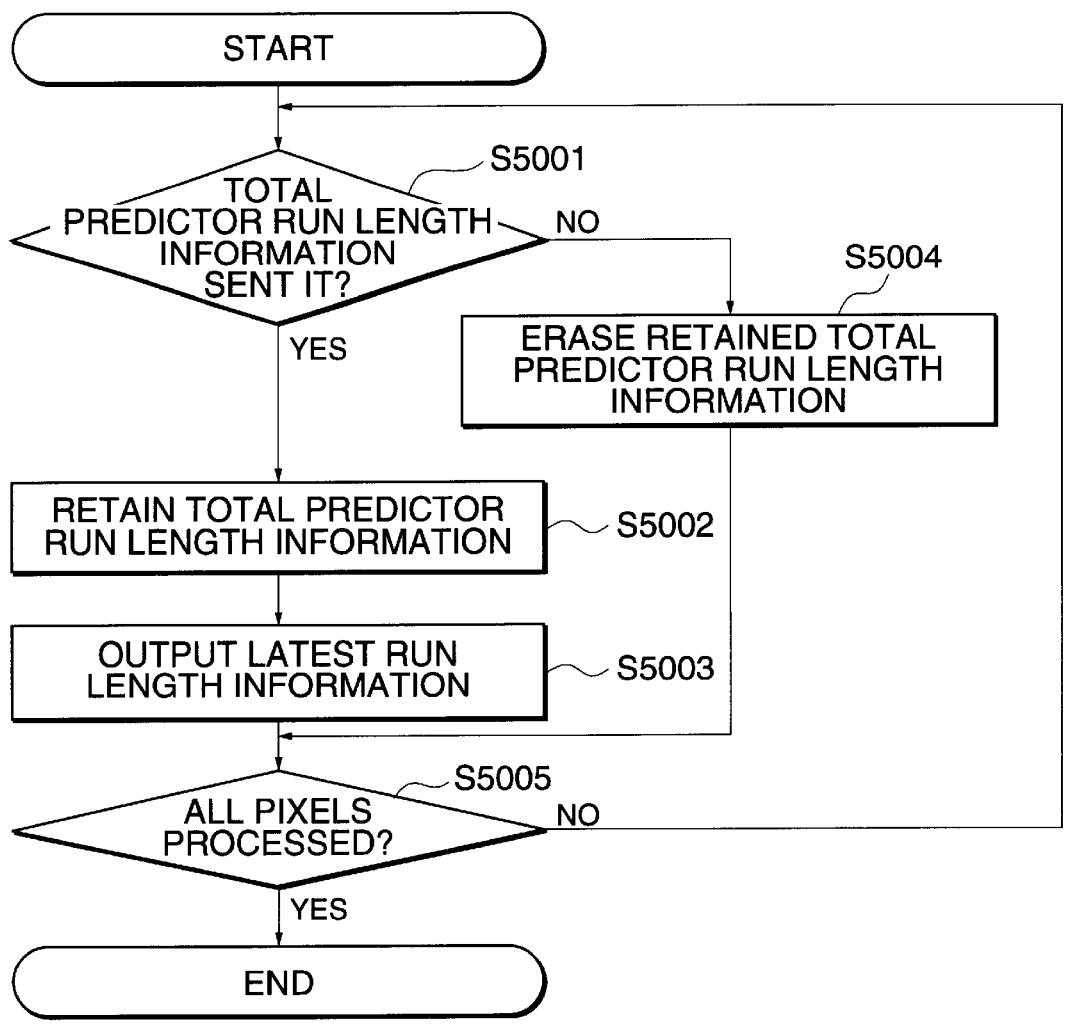
FIG. 9 is a flowchart of steps constituting the image coding method implemented as part of the second embodiment, the flowchart showing more particularly steps performed by a total predictor rank/run length holding circuit in the image coding apparatus of FIG. 6.

What follows is a description of the image coding method of the second embodiment, i.e., of how the image coding apparatus of the above-described constitution typically works. FIGS. 7, 8 and 9 are flowcharts of steps outlining the image coding method of the second embodiment.

The predictors 12a through 12e in the image coding apparatus of the second embodiment, as in the first embodiment, approximate values of the target pixel X to be coded. As indicated in FIG. 7, the predictor determination circuit 21 computes a prediction error of each of the predictors (S3001). A check is made to see if each prediction error falls within the tolerance 105 (S3002).

If some of the prediction errors are judged to fall within the tolerance 105, the predictor determination circuit 21 selects all predictors that have yielded the tolerance-compliant prediction errors. The result of the selection (i.e., index of each selected predictor) is output as a global pixel information priority technique index 106 (S3003).

If none of the prediction errors is found to be within the tolerance 105, the predictor determination circuit 21 judges that the continuity of prediction errors complying with the tolerance 105 has been broken. In that case, based on the maximum run length information 203 from the total predictor rank run length holding circuit 23, the predictor determination circuit 21 checks to see whether the number of runs before the interruption (i.e., continuous pixel count) is larger than one (S3004).

If the run count is larger than one, the predictor determination circuit 21 selects the predictor having a longer run length than any other predictor on the basis of the maximum run length information 203. The result of the selection (i.e., index of the selected predictor) is output as the global pixel information priority technique index 106 (S3005). If the run count is not in excess of one, the predictor determination circuit 21 recognizes a run discontinuity and thus selects the predictor with the smallest prediction error. The prediction error of that predictor is output as the global pixel information priority technique index 106 (S3006).

That is, when determining the global pixel information priority technique index 106, the predictor determination circuit 21 works as follows: if the prediction errors of the predictors 12a through 12e fall within the tolerance 105, a check is made to see, as the target pixel is shifted from one pixel position to another within the input image data 101, whether the prediction errors of the same predictor among those 12a through 12e fall continuously within the tolerance 105. If the errors are found to comply continuously with the tolerance 105, then the predictor having the largest run length is selected to address a group of pixels corresponding to the run length in question regardless of the ranks accorded to the predictors 12a through 12e.

The predictor determination circuit 21 checks to see whether all pixels making up the input image data 101 have been processed (S3007). The steps above are repeated until all pixels have been dealt with (S3001 through S3007).

Given the global pixel information priority technique index 106 from the predictor determination circuit 21, the total predictor rank/run length extraction circuit 22 outputs a coding symbol 108 based on the index 106. At this point, the total predictor rank/run length extraction circuit 22 outputs the coding symbol 108 using the steps shown in FIG. 8.

Upon receipt of the global pixel information priority technique index 106, the total predictor rank/run length extraction circuit 22 checks to see whether the index 106 is a prediction error (S4001). If the index 106 is not found to be a prediction error, the circuit 22 judges that the continuity of prediction errors complying with the tolerance 105 has not been broken. In that case, the total predictor rank/run length extraction circuit 22 supplies the total predictor rank run length holding circuit 23 with total predictor run length information 202 (S4002). The information 202 specifies that the received global pixel information priority technique index 106 be incremented, i.e., that the indexes of all predictors having yielded prediction errors in compliance with the tolerance 105 be added up.

If the global pixel information priority technique index 106 is not found to be a prediction error, the total predictor rank/run length extraction circuit 22 judges that the continuity of prediction errors complying with the tolerance 105 has been broken. The circuit 22 then checks to see if the number of runs before the interruption is greater than one (S4003). If the run count is found to be greater than one, the total predictor rank/run length extraction circuit 22 does not send the total predictor run length information 202 to the total predictor rank run length holding circuit 23. Instead, the circuit 22 supplies the Huffman coding circuit 17 with a coding symbol 108 representing the global pixel information priority technique index 106 from the predictor determination circuit 21, i.e., the index of the predictor selected as having the largest run length before the interruption of the prediction error continuity (S4004).

If the run count up to the error discontinuity is not greater than one, then the total predictor rank/run length extraction circuit 22 recognizes a complete absence of the continuity of prediction errors in compliance with the tolerance 105. In that case, as with the first embodiment, the smallest prediction error received from the predictor determination circuit 21 is forwarded as a coding symbol 108 to the Huffman coding circuit 17 (S4005). At this point, too, the total predictor rank/run length extraction circuit 22 does not send the total predictor run length information 202 to the total predictor rank run length holding circuit 23.

In the above state, the total predictor rank run length holding circuit 23 retains the total predictor run length information 202 using the steps shown in FIG. 9. The circuit 23 first checks to see if the total predictor run length information 202 has been sent from the total predictor rank/run length extraction circuit 22 (S5001). This check is made every time a new target pixel to be coded is taken up.

If the total predictor run length information 202 is found being sent in, the total predictor rank run length holding circuit 23 receives and retains the information 202 (S5002). The run length information updated by use of the received total predictor run length information 202 (e.g., following an increment of the continuous run count) is sent as maximum run length information 203 to the predictor determination circuit 21 (S5003). If the total predictor run length information 202 is not found to be sent in, the total predictor rank run length holding circuit 23 recognizes a prediction error discontinuity and erases the retained total predictor run length information 202 accordingly (S5004).

The total predictor rank run length holding circuit 23 then checks to see if all pixels making up the input image data 101 have been processed (S5005). The steps above are repeated until all pixels have been dealt with (S5001 through S5005).

According to the image coding apparatus and image coding method of the second embodiment, as described above, one of the predictors 12a through 12e is selected to approximate a target pixel to be coded. A check is made to see, as the target pixel is shifted from one pixel position to another, whether the prediction errors of the same predictor among those 12a through 12e fall continuously within the tolerance 105. If the errors are found to comply continuously with the tolerance 105, then the predictor having the largest run length is selected preferentially to address a group of pixels corresponding to the run length in question. That is, as long as the prediction errors of the predictors comply with the tolerance 105, the predictor with the largest run length is selected preferentially regardless of differences in magnitude between the errors involved.

The image coding apparatus or image coding method of the second embodiment adopts as a selection rule not only the prediction errors in increments of pixels but also run lengths of the errors. Any of the predictors 12a through 12e is selected in such a manner that the largest run length remains in effect. This prevents deterioration in image quality due to predictor tolerance restrictions while enhancing coding efficiency. Concurrently the burdens of coding computations are alleviated. Where not only artificial image data but also noise-plagued scan-in image data are to be dealt with, the ranking indexes of the predictors are turned into run lengths through prediction coding involving the preferential use of the predictor with the largest run length. This promotes sub-sampling of the target pixel to be coded and further boosts coding efficiency.

Third Embodiment

Figure 10:
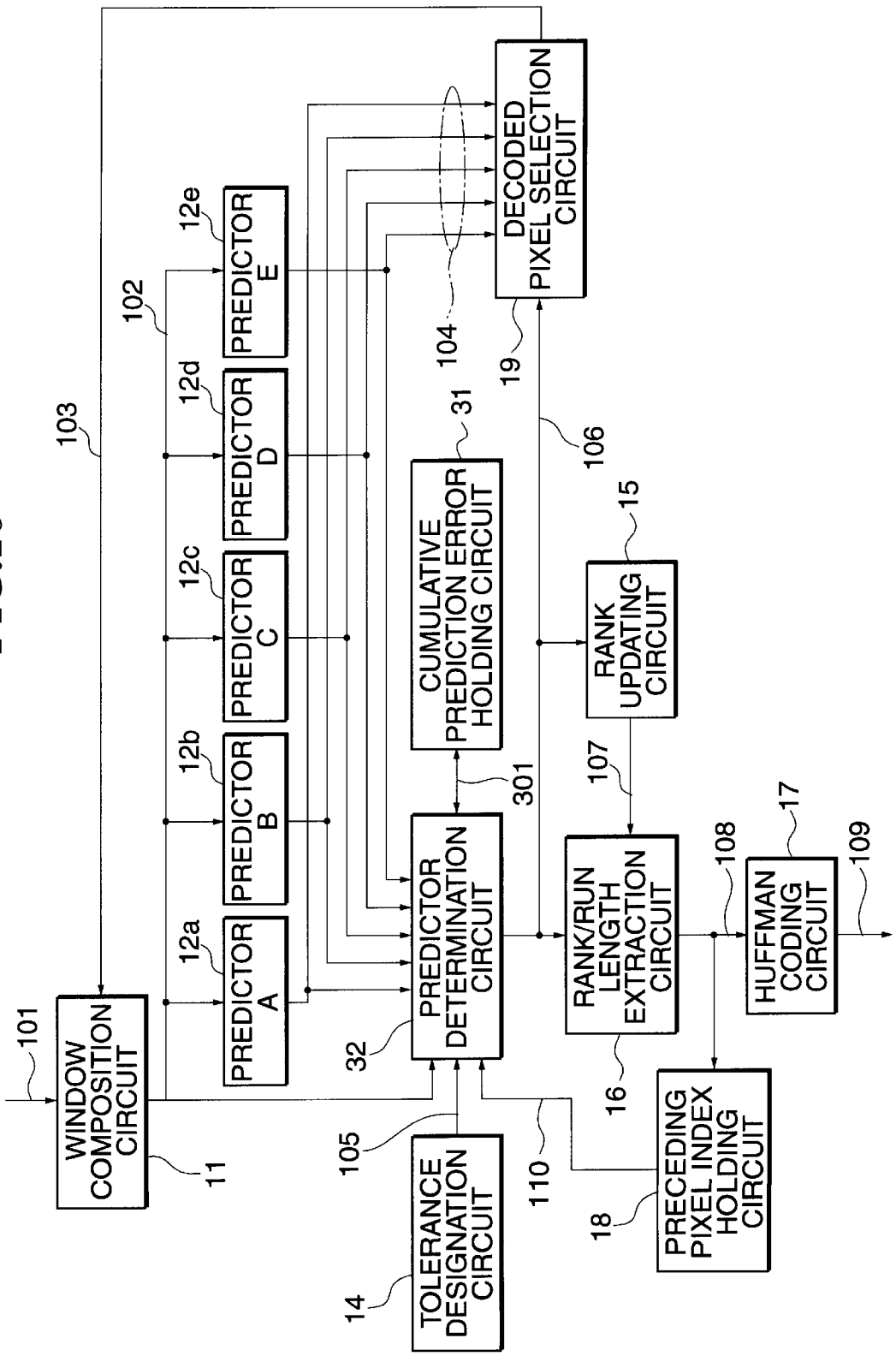
FIG. 10 is a schematic block diagram of an image coding apparatus practiced as part of a third embodiment of this invention.

An image coding apparatus and an image coding method practiced as the third embodiment are described below. A constitution of the image coding apparatus is described first. FIG. 10 is a schematic block diagram of the image coding apparatus practiced as the third embodiment of this invention. As with the second embodiment, the component parts in FIG. 10 having the same or corresponding functions as their counterparts in the first embodiment are designated by like reference numerals, and their descriptions are omitted as redundant. The description below focuses on differences between the third embodiment and the first or the second embodiment.

As illustrated in FIG. 10, the image coding apparatus of the third embodiment is a variation of the first embodiment supplemented with a cumulative prediction error holding circuit 31.

The cumulative prediction error holding circuit 31 receives and accumulates errors computed by a predictor determination circuit 32 regarding each of the predictors 12a through 12e. In response to a request from the predictor determination circuit 32, the cumulative prediction error holding circuit 31 sends the retained cumulative value to the circuit 32 as a cumulative prediction error value 301. The cumulative prediction error holding circuit 31 functions as the cumulative error holding element of this invention.

The predictor determination circuit 32 of the third embodiment, compared with its counterpart in the first embodiment, has an additional function: in selecting one of the predictors 12a through 12e to address the target pixel, the predictor determination circuit 32 adds the cumulative error coming from the cumulative prediction error holding circuit 31 to the error computed with respect to the pixel in question. The sum of the errors is used as a basis for the circuit 32 to select the suitable predictor.

Figure 11:
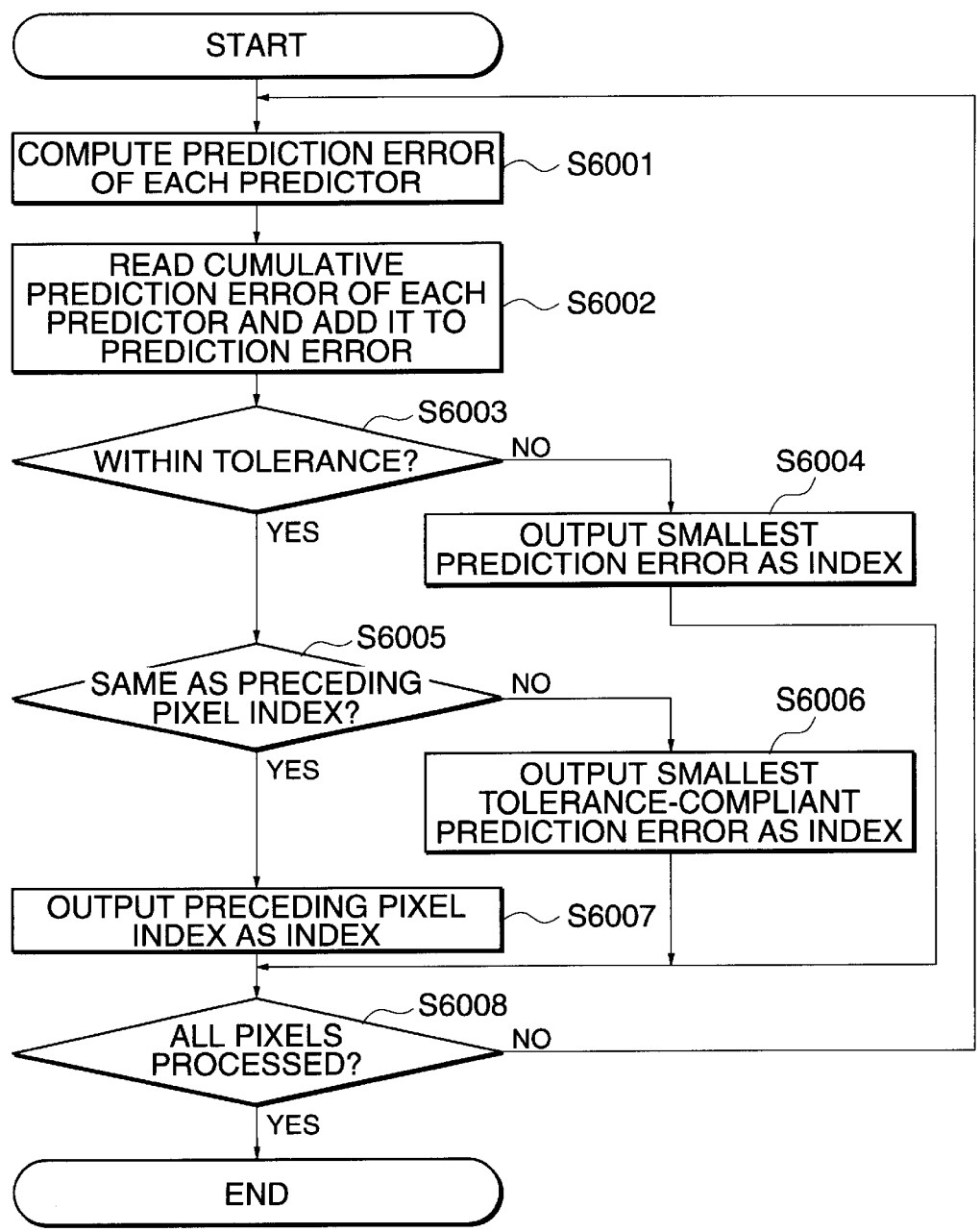
FIG. 11 is a flowchart of steps constituting an image coding method implemented as part of the third embodiment, the flowchart showing more particularly steps performed by a predictor determination circuit in the image coding apparatus of FIG. 10.
Figure 12:
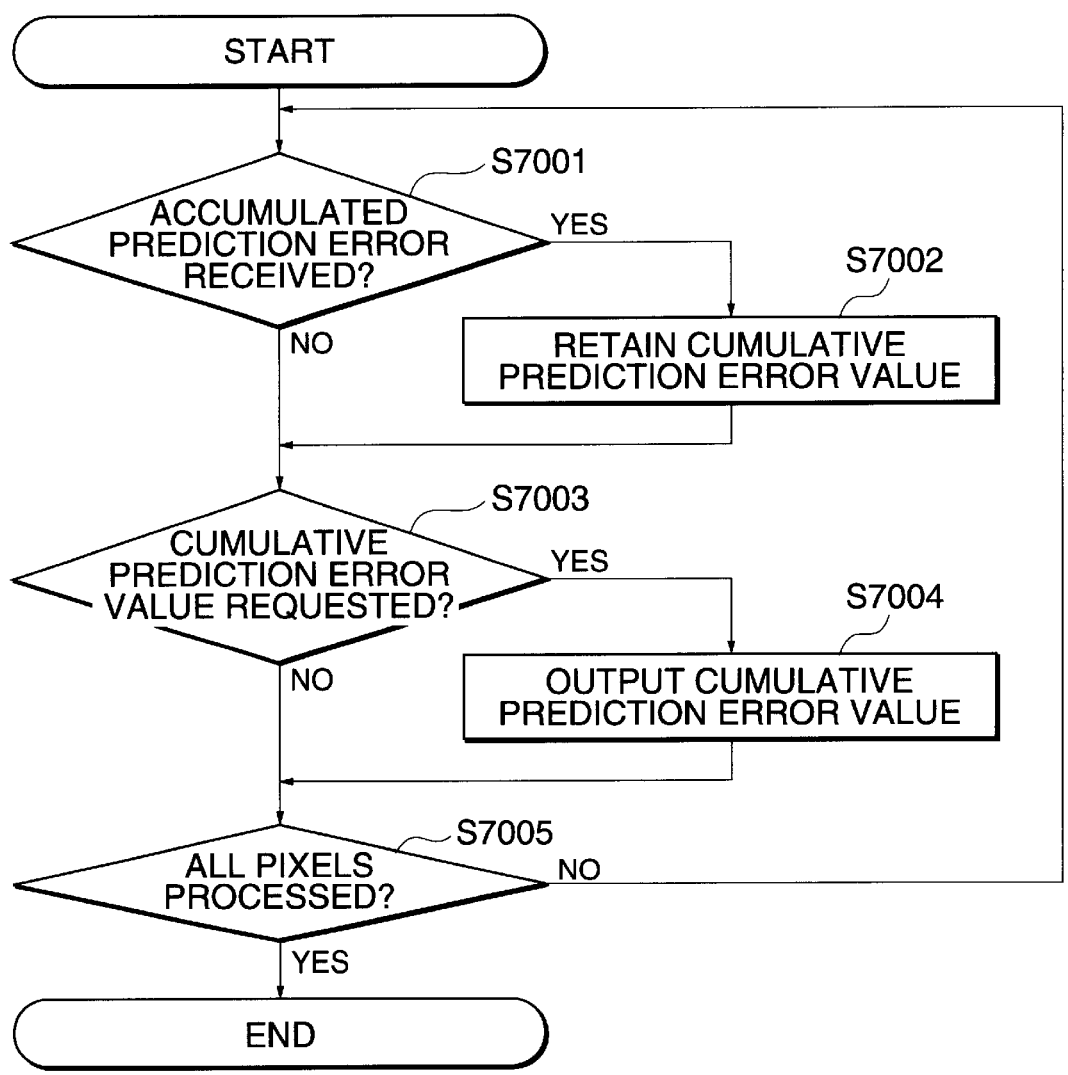
FIG. 12 is a flowchart of steps constituting the image coding method implemented as part of the third embodiment, the flowchart showing more particularly steps performed by a cumulative prediction error holding circuit in the image coding apparatus of FIG. 10.
Figure 13:
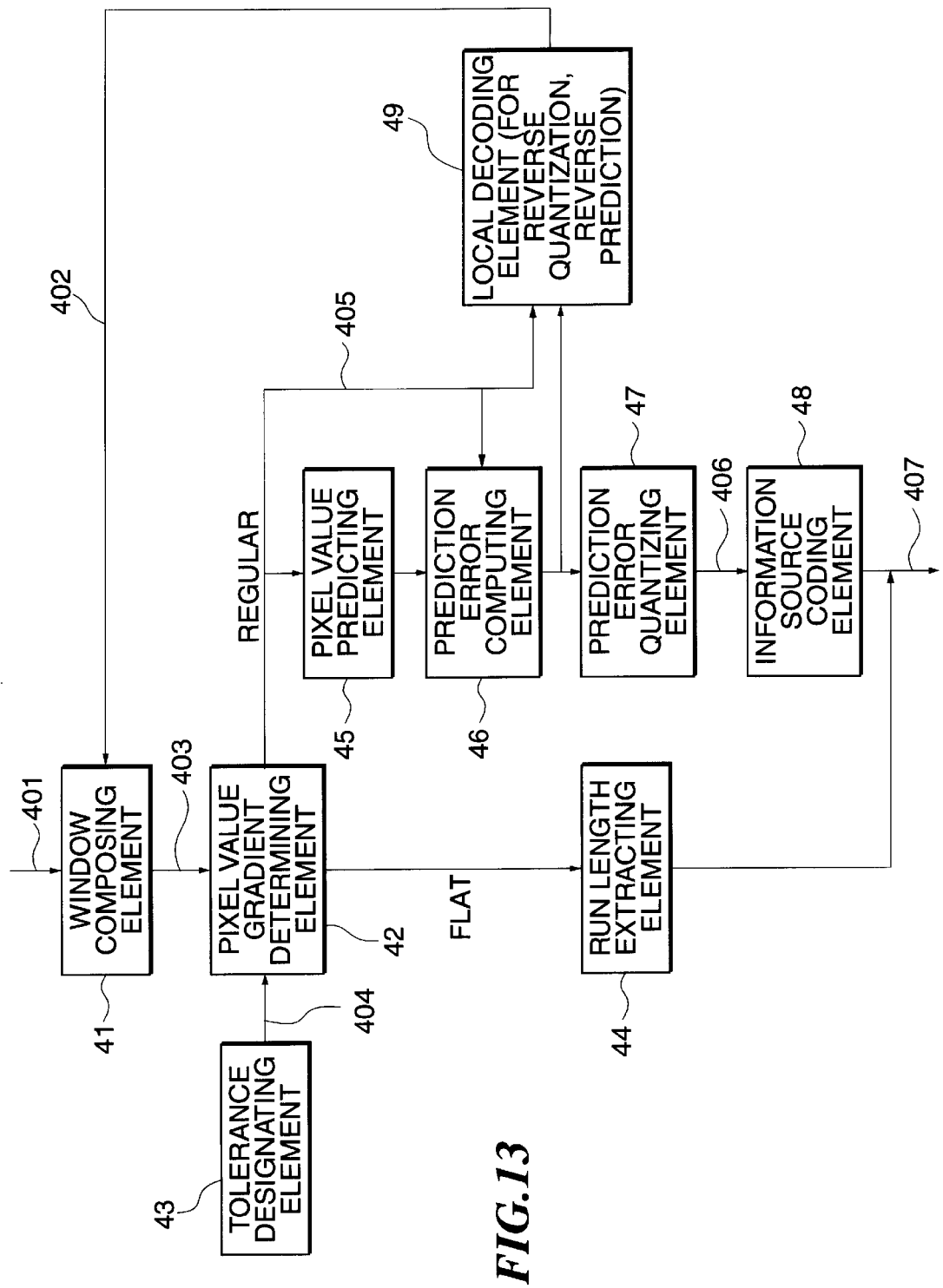
FIG. 13 is a schematic block diagram of an image coding apparatus based on the conventional JPEG-LS coding method.
Figure 14:
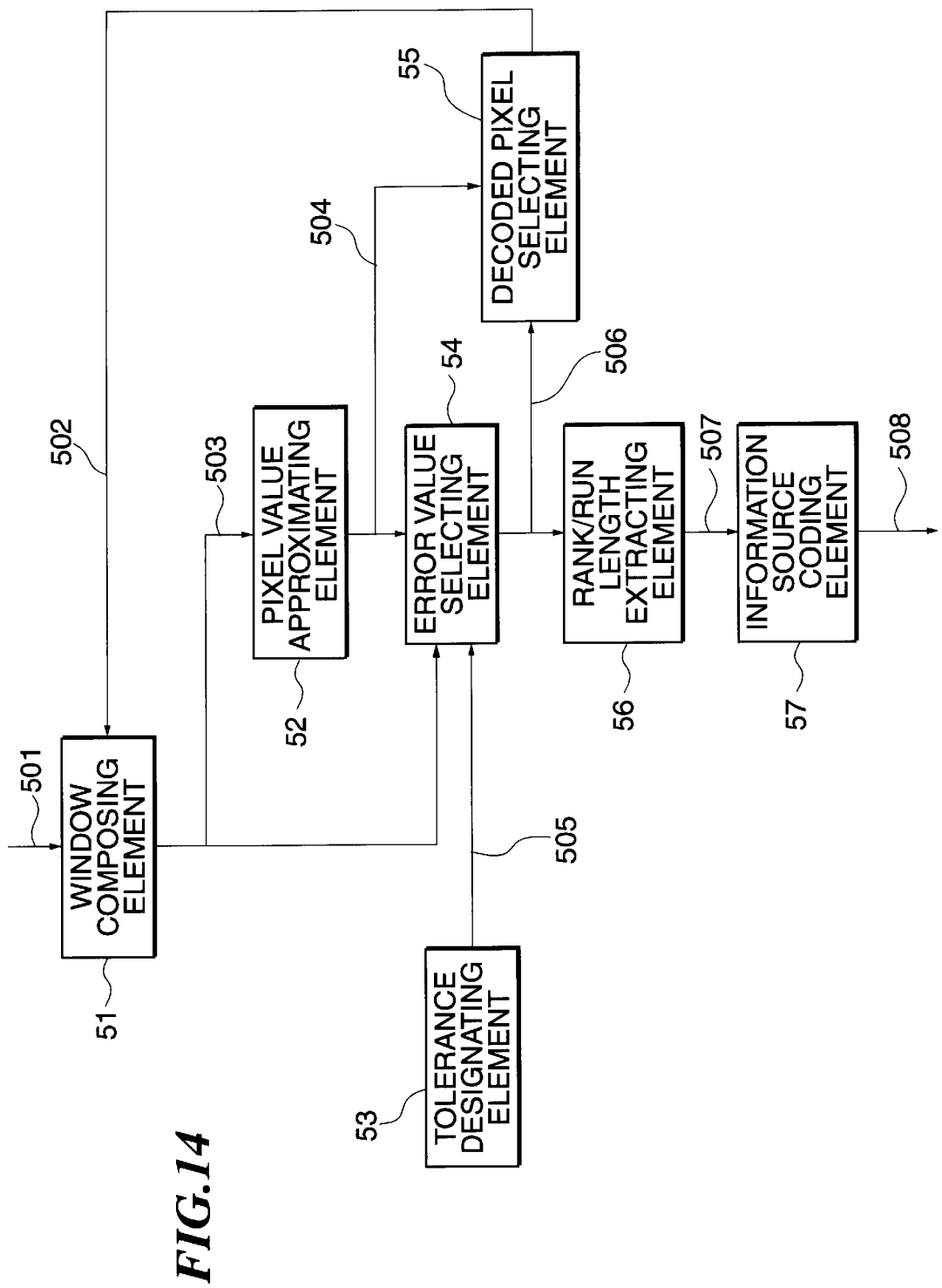
FIG. 14 is a schematic block diagram of an image coding apparatus based on another conventional coding method.

Below is a description of the image coding method of the third embodiment, i.e., of how the image coding apparatus of the above-described constitution typically works. FIGS. 11 and 12 are flowcharts of steps outlining the image coding method of the third embodiment.

As with the first embodiment, the predictors 12a through 12e in the image coding apparatus of the third embodiment approximate values of a target value X to be coded. With the approximate values thus predicted, the predictor determination circuit 32 computes a prediction error of each of the approximated values as shown in FIG. 11 (S6001).

With the prediction error computed, the predictor determination circuit 32 receives the cumulative prediction error value 301 about each of the predictors 12a through 12e from the cumulative prediction error holding circuit 31, and adds the received value to the prediction error for each predictor (S6002). The predictor determination circuit 32 then checks to see if the sum of the errors falls within the tolerance 105 designated by the tolerance designation circuit 14 (S6003). The subsequent steps are the same as those of the first embodiment (S6004 through S6008).

The predictor determination circuit 32 also supplies the cumulative prediction error holding circuit 31 with the results of the prediction error computation (i.e., after addition of the cumulative prediction error value 301) regarding all predictors 12a through 12e.

The cumulative prediction error holding circuit 31 accumulates the sum of the prediction errors and outputs the cumulative prediction error value 301 using the steps shown in FIG. 12. The circuit 31 first receives (S7001) the result of the prediction error computation (i.e., after addition of the cumulative prediction error value 301), and retains the received result as the cumulative prediction error value 301 (S7002). Upon receipt of a command or like request from the predictor determination circuit 32 requesting the cumulative prediction error value 301 (S7003), the cumulative prediction error holding circuit 31 returns to the circuit 32 (S7004) the cumulative prediction error value 301 which is in effect at that point and which has been accumulated up to the pixel preceding the current target pixel of interest to be processed by the circuit 32.

The cumulative prediction error holding circuit 31 then checks to see if all pixels making up the input image data 101 have been processed (S7005). The steps above are repeated until all pixels have been dealt with (S7001 through S7005).

According to the image coding apparatus and image coding method of the third embodiment, as described above, one of the predictors 12a through 12e is selected to approximate the target pixel to be coded. The cumulative prediction error value 301 regarding each of the predictors 12*a* through 12*e* is added up to provide a basis for predictor selection. That is, not only localized information about the peripheral pixels surrounding each target pixel but also more extensive information about past pixels is used as a determining rule by which to select the appropriate predictor.

By utilizing not only the localized information but also global information about pixels as a yardstick for predictor selection, the image coding apparatus or image coding method of the third embodiment offsets widespread prediction errors spanning the image pixel data 101. If localized prediction errors are apparently small but amount to a significant prediction error when accumulated for the entire input image data 101, it is possible to bypass the predictor that has yielded the error in its approximation. As with the first embodiment, the third embodiment promotes subsampling of the target pixel to be coded and enhances the image quality for more extensive areas while offering better coding efficiency than before.

Although the third embodiment has been shown selecting any of the predictors 12*a* through 12*e* in the same manner as the first embodiment, this is not limitative of the invention. Alternatively, predictors may be selected in the same manner as with the second embodiment with no less image quality enhancement.

To sum up, in submitting artificial and scan-in image data to the same framework of reversible or near-reversible coding, the inventive image coding apparatus and image coding method select the technique for predicting the target pixel to be coded not only on the basis of localized pixel information but also with reference to more extensive pixel value information which may illustratively cover previously assigned ranks, run lengths, or cumulative errors of the prediction techniques involved. Such features boost coding efficiency and enhance image quality in non-reversible coding without recourse to bulky computation resources or massive calculation processes (e.g., the loads of computations are one order of magnitude less than JPEG).

It is to be understood that while the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

The entire disclosure of Japanese Patent Application No. 2000-70763 filed on Mar. 14, 2000 including specification, claims, drawings and summary is incorporated herein by reference in its entirety.

What is claimed is:

1. An image coding apparatus comprising:

an approximating element which has plural different prediction techniques to approximate, in input image data, a value of a target pixel to be coded with reference to values of peripheral pixels surrounding the target pixel;

a holding element which holds information about ranks of the prediction techniques, the ranks being obtained upon processing of the pixel preceding the target pixel;

a determining element which computes an error between each of approximate values obtained by the plural prediction techniques and the value of the target pixel, and which selects one of the prediction techniques for the target pixel based on the computed error, the determining element performing the selection by preferentially referencing the rank information held in the holding element if the error is within a predetermined tolerance; and a coding element which codes the value of the target pixel using the approximate value obtained by the prediction technique selected by the determining element.

2. An image coding apparatus comprising:

an approximating element which has plural different prediction techniques to approximate, in input image data, a value of a target pixel to be coded with reference to values of peripheral pixels surrounding the target pixel;

a holding element which holds information about run lengths approximated by the prediction techniques, the run lengths being obtained upon processing of each pixel preceding the target pixel;

a determining element which computes an error between each of approximate values obtained by the plural prediction techniques and the value of the target pixel, and which selects one of the prediction techniques for the target pixel based on the computed error, the determining element performing the selection by preferentially referencing the run lengths specified by the information held in the holding element if the error is within a predetermined tolerance; and a coding element which codes the value of the target pixel using the approximate value obtained by the prediction technique selected by the determining element.

3. An image coding apparatus according to claim 1, further comprising:

a cumulative error holding element which accumulates the error computed by the determining element regarding each of the prediction techniques, wherein the determining element adds the accumulated error held in the cumulative error holding element to the error computed for the target pixel to be coded, and selects one of the prediction techniques for the target pixel by using sum of the errors.

4. An image coding method comprising the steps of:

approximating, in input image data, a value of a target pixel to be coded with reference to values of peripheral pixels surrounding the target pixel by using plural different prediction techniques;

computing an error between each of approximate values obtained by the prediction techniques and the value of the target pixel, to determine whether the computed error is within a predetermined tolerance;

if the error is found to be within the predetermined tolerance and if the prediction techniques have been given ranks beforehand, then selecting one of the prediction techniques for the target pixel by preferentially referencing the ranks;

if the error is not within the predetermined tolerance and if the prediction techniques are not given ranks, then selecting one of the prediction techniques for the target pixel on the basis of differences in magnitude between the errors regarding the approximate values; and coding the target pixel using the approximate value provided by the selected prediction technique.

5. An image coding method comprising the steps of:

approximating, in input image data, a value of a target pixel to be coded with reference to values of peripheral pixels surrounding the target pixel by using plural different prediction techniques;

computing an error between each of approximate values obtained by the plural prediction techniques and the value of the target pixel, to determine whether the computed error is within a predetermined tolerance;

if the error of any one of the approximate values obtained by any one of the prediction techniques is found to be within the predetermined tolerance and if the target pixel is shifted successively from one pixel position to another within the input image data, then determining whether the errors of the approximate values obtained by the same prediction technique in different pixel positions fall successively within the predetermined tolerance;

if the errors of pixels having run lengths are found to be successively within the predetermined tolerance, then selecting one of the prediction techniques that provides the largest run length as the prediction technique for a group of pixels corresponding to the largest run length;

if the computed error is not found to be within the predetermined tolerance and if the errors in different pixel positions are not successively found to be within the tolerance, then selecting one of the prediction techniques for the target pixel on the basis of differences in magnitude between the errors regarding the approximate values; and coding the target pixel using the approximate value provided by the selected prediction technique.

6. An image coding method according to claim 4, further comprising the step of:

computing the error between each of the approximate values obtained by the plural prediction techniques and the value of the target pixel to be coded, before adding to the computed error the errors accumulated by each of the prediction techniques with regard to each pixel preceding the target pixel, wherein a check is made to see whether a sum of the errors is found to be within the predetermined tolerance.

* * * * *